(12) United States Patent
Zhang et al.

(10) Patent No.: US 12,365,638 B2
(45) Date of Patent: Jul. 22, 2025

(54) HIGH-NUTRIENT AND HIGH-ACTIVITY CHEMICAL FERTILIZER-BIOLOGICAL COMPOUND FERTILIZER, AND PREPARATION METHOD AND APPLICATION THEREOF

(71) Applicant: SHANDONG ACADEMY OF AGRICULTURAL SCIENCES, Shandong (CN)

(72) Inventors: Yufeng Zhang, Shandong (CN); Zhaohui Liu, Shandong (CN)

(73) Assignee: SHANDONG ACADEMY OF AGRICULTURAL SCIENCES, Jinan (CN)

( * ) Notice: Subject to any disclaimer, the term of this patent is extended or adjusted under 35 U.S.C. 154(b) by 0 days.

(21) Appl. No.: 18/935,700

(22) Filed: Nov. 4, 2024

(65) Prior Publication Data

US 2025/0059106 A1 Feb. 20, 2025

Related U.S. Application Data

(63) Continuation of application No. PCT/CN2024/077723, filed on Feb. 20, 2024.

(30) Foreign Application Priority Data

Feb. 20, 2023 (CN) .......................... 202310138447.4

(51) Int. Cl.
| | |
|---|---|
| *C05F 11/08* | (2006.01) |
| *C05B 7/00* | (2006.01) |
| *C05C 3/00* | (2006.01) |
| *C05C 9/00* | (2006.01) |
| *C05D 1/00* | (2006.01) |
| *C05D 1/02* | (2006.01) |
| *C05G 5/12* | (2020.01) |

(52) U.S. Cl.
CPC ................ *C05F 11/08* (2013.01); *C05B 7/00* (2013.01); *C05C 3/005* (2013.01); *C05C 9/005* (2013.01); *C05D 1/005* (2013.01); *C05D 1/02* (2013.01); *C05G 5/12* (2020.02)

(58) Field of Classification Search
CPC .... C05B 7/00; C05G 3/00; C05G 5/12; C05F 11/08; C05C 3/005; C05C 9/005; C05D 1/005; C05D 1/02; A01N 27/00; A01N 31/00
See application file for complete search history.

(56) References Cited

FOREIGN PATENT DOCUMENTS

| CN | 102153383 A | | 8/2011 | |
|---|---|---|---|---|
| CN | 103086761 A | | 5/2013 | |
| CN | 104591887 A | | 5/2015 | |
| CN | 106478210 A | | 3/2017 | |
| CN | 107188710 A | * | 9/2017 | ............. A01C 21/00 |
| CN | 108218567 A | | 6/2018 | |
| CN | 109503274 A | * | 3/2019 | ............. C05B 7/00 |
| CN | 110668896 A | * | 1/2020 | ............. C05D 1/00 |
| CN | 112342255 A | | 2/2021 | |
| CN | 112409076 A | * | 2/2021 | ............. C05B 7/00 |
| CN | 113880642 A | | 1/2022 | |
| CN | 115612707 A | * | 1/2023 | ............. C05C 11/00 |

OTHER PUBLICATIONS

International Search Report of PCT Patent Application No. PCT/CN2024/077723 issued on May 30, 2024.

\* cited by examiner

*Primary Examiner* — Wayne A Langel

(57) ABSTRACT

A high-nutrient and high-activity chemical fertilizer-biological compound fertilizer, and a preparation method and application thereof are provided. The high-nutrient and high-activity chemical fertilizer-biological compound fertilizer includes an inorganic chemical fertilizer and a microbial agent. The chemical fertilizer-biological compound fertilizer has nutrient contents of nitrogen, phosphorus, and potassium of greater than 40% and a viable number of microorganisms of 200 million cfu/g or more. The chemical fertilizer-biological compound fertilizer further includes a microbial protectant, and a mass ratio of the microbial protectant to the microbial agent is ≥1.

18 Claims, No Drawings

HIGH-NUTRIENT AND HIGH-ACTIVITY CHEMICAL FERTILIZER-BIOLOGICAL COMPOUND FERTILIZER, AND PREPARATION METHOD AND APPLICATION THEREOF

CROSS-REFERENCE TO RELATED APPLICATIONS

The present application is a continuation application of PCT application No. PCT/CN2024/077723 filed on Feb. 20, 2024, which claims the benefit of Chinese Patent Application No. 202310138447.4 filed on Feb. 20, 2023. The contents of all of the aforementioned applications are incorporated by reference herein in their entirety.

FIELD OF THE INVENTION

The present disclosure relates to a high-nutrient and high-activity chemical fertilizer-biological compound fertilizer, and a preparation method and application thereof, belonging to the technical field of agricultural fertilizers.

BACKGROUND OF THE INVENTION

Chemical fertilizers are the "food" of grains, contributing as much as 50% to the increase in grain production in China, serving as the "ballast stone" ensuring the national grain security by meeting the current demand of 670 million tons of grains for the 1.4 billion population. However, the utilization rates of the chemical fertilizers have been very low, and the utilization rates of nitrogen and phosphorus fertilizers are only about 40% and 20%, respectively. The long-term excessive application of the chemical fertilizer causes soil hardening, reduction of soil microbial species and quantity, destruction of the soil ecosystem, impact on the quality of agricultural products, and environmental pollution, which seriously threaten the national grain security and ecological security. Microbial fertilizers refer to products containing specific living microorganisms, which improve the growth and physiological characteristics of plants through the metabolic activities of microorganisms, promote the absorption of nutrients by plants, thereby promoting growth and improving quality. Many years of application have shown that there are still problems in the production, such as keeping the strains alive and the unstable effect of field application. Affected by the price of the microbial fertilizer, the application amount of the microbial fertilizer is low, generally 10-20 kg/mu. The uneven application of the microbial fertilizer alone in the field, the lack of obvious the fertilizer efficiency, and the increase in fertilization cost lead to low acceptance of the microbial fertilizer by farmers.

Studies have shown that the organic combination of beneficial microbial agents and chemical fertilizers can not only significantly improve the nutrient utilization efficiency, but also improve crop quality, improve soil, and enhance crop stress resistance. However, it is a worldwide problem to uniformly mix a chemical fertilizer with a high salt index and viable beneficial microorganisms to prepare a chemical fertilizer-biological compound fertilizer and maintain the high activity of beneficial microorganisms. In the existing preparation process of the chemical fertilizer-biological compound fertilizer, after adding microorganisms to the chemical fertilizer, high temperature, high salt, drying, and other factors will cause the death of a large number of microorganisms. Therefore, in order to ensure the effect of the chemical fertilizer-biological compound fertilizer, it is necessary to solve the problem of activity of microorganisms.

The patent document CN104591887A discloses a compound microbial fertilizer with a high nutrient content and a preparation method thereof. Kaolin, humic acid, an organic fertilizer, and an inorganic chemical fertilizer are mixed and granulated, and then a polyglutamic acid solution is sprayed to coat the fertilizer granules, effectively blocking direct contact between microbial strains and the inorganic chemical fertilizer. The organic chemical fertilizer can provide a living environment and nutrients for microorganisms and ensure the survival rate and efficacy of the strains. The total nutrient of the compound microbial fertilizer is 15% or more. The patent document CN106478210A discloses a multifunctional compound microbial fertilizer and a preparation method thereof. The multifunctional compound microbial fertilizer is prepared by compounding organic materials such as fermented furfural residue, fermented mushroom residue, and plant ash in a specific ratio to provide a living environment and nutrients for microorganisms, stimulate them to produce active substances, facilitate the improvement of the activity of their metabolites, ensure the survival rate and efficacy of strains, and better play their efficacy.

The fertilizers prepared in the above two patents are compound microbial fertilizers, which have a high price due to the limitation of organic materials, are generally sold at a price of 1,500-2,500 RMB/ton, and are mainly applied to crops with high economic values, such as vegetables and fruit trees. Moreover, such fertilizers cannot provide all of the nutrients needed during the growing period of crops, and they are required to be combined with a certain amount of chemical fertilizer. In the existing preparation process of the compound microbial fertilizer, there are two ways to add microorganisms. One is that the strains are mixed with conventional chemical fertilizers for granulation, and the other is that the strains are sprayed after granulation. In the process of adding microorganisms during granulation, high temperature and high salt will cause the death of a large number of microorganisms. Inorganic chemical fertilizers, especially high nitrogen, are extremely lethal to microorganisms. The survival rate of microorganisms of the spraying method is high, but there are still some problems, for example, the microbial fertilizer cannot be stored for a long time, the effective period is short, the viable number is greatly reduced in a short time, the microbial powder falls off due to the friction of particles in the process of placing and transporting.

Due to field crops returning to field for many years, the soil contains an abundance of organic materials, requiring bacterial agents to accelerate straw decomposition, promote nutrient breakdown, and prevent soil-borne diseases like wheat and maize root rot. Therefore, it is one of the effective measures to solve the problem of the low utilization rate of fertilizer and improve the nutrient absorption of crops by preparing a fertilizer with a high nutrient content and high-activity functional bacterial agents to apply the nutrients and high-activity functional bacterial agents to the soil simultaneously.

SUMMARY OF THE INVENTION

In view of the deficiencies of the related art, the present disclosure provides a high-nutrient and high-activity chemical fertilizer-biological compound fertilizer and a preparation method thereof. The present disclosure also provides application of the high-nutrient and high-activity chemical fertilizer-biological compound fertilizer in crops.

SUMMARY

In the present disclosure, a high-nutrient and high-activity chemical fertilizer-biological compound fertilizer with a nutrient content of 40-55% and a viable number of microorganisms of 200 million cfu/g or more is prepared by mixing and granulating a chemical fertilizer with a functional microbial agent and a microbial protectant.

Description of Terms:

Room temperature, having a meaning well known in the art, is typically at 23±3° C.

The nutrient contents of nitrogen, phosphorus, and potassium refer to contents of N, $P_2O_5$, and $K_2O$.

The Technical Solutions of the Present Disclosure are as Follows:

A high-nutrient and high-activity chemical fertilizer-biological compound fertilizer is provided, including an inorganic chemical fertilizer and a microbial agent, where the chemical fertilizer-biological compound fertilizer has nutrient contents of nitrogen, phosphorus, and potassium of greater than 40% and a viable number of microorganisms of 200 million cfu/g or more.

Preferably, according to the present disclosure, the high-nutrient and high-activity chemical fertilizer-biological compound fertilizer has nutrient contents of nitrogen, phosphorus, and potassium of 40-55% and a viable number of microorganisms of 0.2-1 billion cfu/g.

Preferably, according to the present disclosure, the high-nutrient and high-activity chemical fertilizer-biological compound fertilizer further includes a microbial protectant, where a mass ratio of the microbial protectant to the microbial agent is ≥1.

Further preferably, the mass ratio of the microbial protectant to the microbial agent is (1-100): 1.

Preferably, according to the present disclosure, the inorganic chemical fertilizer includes an inorganic nitrogen fertilizer, an inorganic phosphorus fertilizer, and an inorganic potassium fertilizer; the inorganic chemical fertilizer includes, in parts by mass: 15-55 parts of the inorganic nitrogen fertilizer, 20-50 parts of the inorganic phosphorus fertilizer, and 10-50 parts of the inorganic potassium fertilizer. Further preferably, the inorganic nitrogen fertilizer includes urea and ammonium sulfate; the inorganic phosphorus fertilizer includes monoammonium phosphate and diammonium phosphate; the inorganic potassium fertilizer includes potassium sulfate, potassium chloride, and potassium nitrate.

In the present disclosure, the inorganic nitrogen fertilizer, the inorganic phosphorus fertilizer, and the inorganic potassium fertilizer are all commercially available products.

Preferably, according to the present disclosure, the microbial agent mainly includes at least one of *Bacillus amyloliquefaciens* and *Bacillus subtilis*.

Further preferably, the microbial agent further includes one or more of *Bacillus megaterium, Bacillus mucilaginosus, Brevibacillus laterosporu, Bacillus thuringiensis, Paenibacillus polymyxa*, and *Trichoderma harzianum*.

Preferably, according to the present disclosure, the microbial protectant mainly includes alginate oligosaccharide and tetrahydropyrimidine.

Further preferably, the microbial protectant further includes at least one of burdock oligosaccharide, chitosan oligosaccharide, amino acid, vegetable oil, fumaric acid, and citric acid.

Further preferably, components in the microbial protectant include, in parts by mass: 65-85 parts of alginate oligosaccharide, 4-6 parts of burdock oligosaccharide, 6-10 parts of chitosan oligosaccharide, 6-10 parts of amino acid, 5-10 parts of vegetable oil, 5-8 parts of tetrahydropyrimidine, 8-10 parts of fumaric acid, and 6-10 parts of citric acid.

Further preferably, alginate oligosaccharide has a molecular weight 2000 Da or less, a degree of polymerization of 2-20, and a 2-6 sugar content 70% or more.

Further preferably, burdock oligosaccharide has a degree of polymerization of 10-15.

Further preferably, amino acid includes one or more of glutamic acid, aspartic acid, and phenylalanine.

Further preferably, the vegetable oil includes soybean oil and/or castor oil.

Alginate oligosaccharide, burdock oligosaccharide, chitosan oligosaccharide, amino acid, vegetable oil, tetrahydropyrimidine, fumaric acid, and citric acid in the present disclosure may all be commercially available products.

Further preferably, the microbial protectant is obtained by quantitatively taking raw materials of the components of the microbial protectant, stirring and mixing uniformly.

A preparation method for the above-mentioned high-nutrient and high-activity chemical fertilizer-biological compound fertilizer is provided, including the steps of:

mixing a microbial agent and a microbial protectant, and then mixing with raw materials of an inorganic chemical fertilizer uniformly, granulating, spheroidizing, screening, and packaging to obtain a high-nutrient and high-activity chemical fertilizer-biological compound fertilizer.

Preferably, according to the present disclosure, granules of the obtained chemical fertilizer-biological compound fertilizer are round and have a particle size of 2.8-4.75 mm and a hardness of 30-40 N.

Application of the above-mentioned high-nutrient and high-activity chemical fertilizer-biological compound fertilizer in soil fertilization of crops is provided.

In the present disclosure, the high-nutrient and high-activity chemical fertilizer-biological compound fertilizer may be used for soil fertilization of crops such as rice, wheat, maize, leguminous plants, vegetables, and fruit trees, and has a significant promoting effect on crop yield increase, quality improvement, stress resistance, soil efficiency enhancement, soil enrichment, antifouling, and fertilizer utilization rate.

According to the specific use of the high-nutrient and high-activity chemical fertilizer-biological compound fertilizer, the application mode thereof may be adjusted adaptively as follows.

1. Variety of High-Nutrient and High-Activity Chemical Fertilizer-Biological Compound Fertilizer According to the law of fertilizer requirements and soil characteristics of specific crops, a high-nutrient and high-activity chemical fertilizer-biological compound fertilizer suitable for crop-specific soil is selected.

2. Application Amount

According to the cultivation conditions and the maximum limit of crop yield, an average yield in the past three years is increased by 10%-15% as a target yield. According to the target yield, if the yield is kept stable, the application amount of the fertilizer may be reduced to 80%-90% of the original application amount of the conventional compound fertilizer.

3. Administration Method

The method of simultaneous sowing of seeds and fertilizers, mechanical sprinkling, or manual one-time sprinkling is used. During the simultaneous sowing of seeds and fertilizers, vertical and horizontal intervals are 8-10 cm, preventing burning the seeds. After sprinkling, ploughing or earthing is performed.

Beneficial effects of the present disclosure are as follows:
1. The chemical fertilizer-biological compound fertilizer of the present disclosure has a high nutrient content and strong microbial activity. The chemical fertilizer-biological compound fertilizer refers to a compound fertilizer containing high-concentration inorganic nitrogen, phosphorus, and potassium fertilizers and an active microbial agent. In a preferred technical solution, the fertilizer-biological compound fertilizer has nutrient contents of nitrogen, phosphorus, and potassium of greater than 40% and the number of microorganisms of 0.2-1 billion cfu/g. The mass ratio of the microbial protectant using alginate oligosaccharide as the main raw material to the microbial agent is (1-100): 1. After 12 months of storage, the number of microorganisms in the chemical fertilizer-biological compound fertilizer is still $2 \times 10^8$ cfu/g or more. After 10 days of application to the soil, the number of microorganisms shows an increasing trend. The nutrient contents of nitrogen, phosphorus, and potassium and the number of microorganisms in the chemical fertilizer-biological compound fertilizer are at least 15% and 180 million cfu/g higher than those in the standard for compound microbial fertilizers (NY/T798-2015), respectively.
2. The high-nutrient and high-activity chemical fertilizer-biological compound fertilizer product of the present disclosure realizes the deep compound of the chemical fertilizer and active microorganisms, has the multiple effects of the chemical fertilizer and the microorganism fertilizer, overcomes the troublesome technical problem of incompatibility of the chemical fertilizer and the microorganism fertilizer in production, storage, transportation, and use, significantly improves the efficiency of chemical fertilizer utilization, reduces the cost of fertilizer use, solves the problem that the microorganism fertilizer cannot be commonly used in field crops, integrates the functions of fertilizer production increase and quality improvement, enriching soil, and antifouling, and provides technical and product support for the renewal of fertilizers as well as green and sustainable development of agriculture.
3. The high-nutrient and high-activity chemical fertilizer-biological compound fertilizer product of the present disclosure realizes the combination of agricultural machinery and agronomy, the combination of good varieties, good fertilizers, and good methods, saves time and labor, and improves the efficiency.

DETAILED DESCRIPTION OF THE EMBODIMENTS

The present disclosure is further described below in conjunction with embodiments, but is not limited thereto. The amounts of the raw materials are parts by weight unless otherwise specified.

A high-nutrient and high-activity chemical fertilizer-biological compound fertilizer is provided, including an inorganic chemical fertilizer and a microbial agent. The chemical fertilizer-biological compound fertilizer has nutrient contents of nitrogen, phosphorus, and potassium of greater than 40% and a viable number of microorganisms of 200 million cfu/g or more.

In a preferred technical solution of the present disclosure, the high-nutrient and high-activity chemical fertilizer-biological compound fertilizer has nutrient contents of nitrogen, phosphorus, and potassium of 40-55%, further preferred 40%, 42%, 44%, 46%, 48%, 50%, and 52%.

In a preferred technical solution of the present disclosure, the high-nutrient and high-activity chemical fertilizer-biological compound fertilizer has a viable number of microorganisms of 0.2-1 billion cfu/g, further preferred 0.2, 0.4, 0.6, 0.8, and 1 billion cfu/g.

The above-mentioned high-nutrient and high-activity chemical fertilizer-biological compound fertilizer further includes a microbial protectant, where a mass ratio of the microbial protectant to the microbial agent is ≥1.

In a preferred technical solution of the present disclosure, the mass ratio of the microbial protectant to the microbial agent is (1-100): 1, further preferred 1:1, 10:1, 20:1, 30:1, 40:1, 50:1, 60:1, 70:1, 80:1, 90:1, and 100:1.

In a preferred technical solution of the present disclosure, the microbial agent mainly includes *Bacillus amyloliquefaciens* (e.g., ACCC60428, ACCC10167, and ACCC60382) and *Bacillus subtilis* (e.g., ACCC60364 and KC2023Hb).

In a preferred technical solution of the present disclosure, the microbial agent further includes one or more of *Bacillus megaterium* (e.g., JD2023Hb), *Bacillus mucilaginosus* (e.g., CGMCC No. 17376), *Brevibacillus* laterosporu (e.g., CGMCC No. 17377, ACCC11079), *Bacillus thuringiensis, Paenibacillus polymyxa,* and *Trichoderma harzianum.*

In the presence of *Bacillus megaterium* JD2023Hb and *Bacillus subtilis* KC2023Hb, the tolerance of other microorganisms to a high-concentration inorganic chemical fertilizer may be further improved, and the protection against other microorganisms may be improved. The preservation number of *Bacillus megaterium* JD2023Hb is CGMCC NO. 29498, and the preservation number of *Bacillus subtilis* KC2023Hb is CGMCC NO. 29499.

Alginate oligosaccharide in the examples has a molecular weight 2000 Da or less, a degree of polymerization of 2-20, and a 2-6 sugar content 70% or more and is obtained by fermenting brown algae, enteromorpha, and other marine plants with a preparation method referring to patent document CN 112342255 A. It may also be commercially available.

Burdock oligosaccharide in the examples has a degree of polymerization of 13 and is extracted from secondary burdock roots using an enzymolysis method. Dry burdock roots are crushed and sieved through a 40-mesh sieve. Hot water extraction is carried out in a solid-solution ratio of 1:10 at 70° C. for 90 min/time, followed by suction filtration, activated carbon decolorization, concentration using a rotary evaporator, papain-seveage deproteinization, ethanol precipitation, centrifugation, multiple washing, centrifugation, and freeze-drying to obtain burdock oligosaccharide dry powder. It is also commercially available.

The vegetable oil in the examples is soybean oil or castor oil, which is a commercially available product.

Chitosan oligosaccharide, tetrahydropyrimidine, fumaric acid, and citric acid in the examples are all commercially available products.

The inorganic nitrogen fertilizer, the inorganic phosphorus fertilizer, and the inorganic potassium fertilizer in the examples are all commercially available products.

The strains involved in the examples are strains that have been disclosed and do not involve the preservation of microorganisms. The bacterial agents involved in the examples are processed by Lihaoyuan Bioengineering Co. Ltd.

Example 1: High-Nutrient and High-Activity Chemical Fertilizer-Biological Compound Fertilizer Suitable for Summer Maize Planted on Saline-Alkali Soil A high-nutrient and high-activity chemical fertilizer-biological compound fertilizer is provided, including an inorganic chemical fertilizer, a microbial agent, and a microbial protectant.

The inorganic chemical fertilizer includes, in parts by mass: 42.8 parts of urea, 10 parts of ammonium sulfate, 28 parts of monoammonium phosphate, and 15 parts of potassium sulfate.

The microbial agent includes: a *Bacillus subtilis* ACCC60364 bacterial agent and a *Bacillus mucilaginosus* CGMCC No. 17376 bacterial agent. The viable number of the *Bacillus subtilis* bacterial agent is 200 billion cfu/g, and the viable number of the *Bacillus mucilaginosus* bacterial agent is 20 billion cfu/g. The microbial agent includes, in parts by mass: 0.32 parts of the *Bacillus subtilis* bacterial agent and 1.18 parts of the *Bacillus mucilaginosus* bacterial agent.

2.7 parts of the microbial protectant are included, in parts by mass. The microbial protectant includes alginate oligosaccharide, chitosan oligosaccharide, soybean oil, tetrahydropyrimidine, and citric acid in a mass ratio of 80:7: 6:6: 9. The microbial protectant is obtained by quantitatively taking raw materials of the above-mentioned components, stirring and mixing uniformly.

A preparation method for the above-mentioned high-nutrient and high-activity chemical fertilizer-biological compound fertilizer is provided, including the following steps.

After mixing the powdery microbial agent and the microbial protectant, raw materials of the inorganic chemical fertilizer were mixed uniformly with them, without adding binder and moisture. Low-temperature and high-pressure dry granulation was performed, and the mixture was dry-pressed into granules at normal temperature. During the granulation process, the activity of microorganisms and extracts was not destroyed. The high-nutrient and high-activity chemical fertilizer-biological compound fertilizer was obtained by spheroidizing, screening, and packaging, and granules of the obtained chemical fertilizer-biological compound fertilizer were round and had a particle size of 2.8-4.75 mm and a hardness of 30-40 N.

The nutrient contents of nitrogen, phosphorus, and potassium in the obtained chemical fertilizer-biological compound fertilizer were 24.9%, 12.3%, and 7.8%, respectively. Theoretical values of viable numbers of *Bacillus subtilis* and *Bacillus mucilaginosus* were 640 million cfu/g and 240 million cfu/g, respectively. The content of the microbial protectant was 0.54% based on the content of oligosaccharide.

After the above-mentioned chemical fertilizer-biological compound fertilizer was stored at normal temperature for one day, the viable number of *Bacillus subtilis* was measured to be 620 million cfu/g, and the viable number of *Bacillus mucilaginosus* was measured to be 220 million cfu/g. After the above-mentioned chemical fertilizer-biological compound fertilizer was stored at normal temperature for 12 months, the viable number of *Bacillus subtilis* was 612 million cfu/g, and the viable number of *Bacillus mucilaginosus* was 206 million cfu/g. The chemical fertilizer-biological compound fertilizer was applied to the soil with an application amount of 100 kg/667 $m^2$. After 10 days, the viable number of *Bacillus subtilis* in the soil was 412,000 cfu/g, and the viable number of *Bacillus mucilaginosus* was 148,000 cfu/g.

Example 2

A high-nutrient and high-activity chemical fertilizer-biological compound fertilizer is provided, including an inorganic chemical fertilizer, a microbial agent, and a microbial protectant.

The inorganic chemical fertilizer includes, in parts by mass: 42.75 parts of urea, 10 parts of ammonium sulfate, 28 parts of monoammonium phosphate, and 15 parts of potassium sulfate.

The microbial agent includes: a *Bacillus subtilis* KC2023Hb bacterial agent and a *Bacillus mucilaginosus* CGMCC No. 17376 bacterial agent. The viable number of the *Bacillus subtilis* bacterial agent is 200 billion cfu/g, and the viable number of the *Bacillus mucilaginosus* bacterial agent is 20 billion cfu/g. The microbial agent includes, in parts by mass: 0.25 parts of the *Bacillus subtilis* bacterial agent and 1.3 parts of the *Bacillus mucilaginosus* bacterial agent.

2.7 parts of the microbial protectant are included, in parts by mass. The microbial protectant includes alginate oligosaccharide, chitosan oligosaccharide, soybean oil, tetrahydropyrimidine, and citric acid in a mass ratio of 80:7: 6:6: 9. The microbial protectant is obtained by quantitatively taking raw materials of the above-mentioned components, stirring and mixing uniformly.

A preparation method for the above-mentioned high-nutrient and high-activity chemical fertilizer-biological compound fertilizer is provided, including the following steps.

After mixing the powdery microbial agent and the microbial protectant, raw materials of the inorganic chemical fertilizer were mixed uniformly with them, without adding binder and moisture. Low-temperature and high-pressure dry granulation was performed, and the mixture was dry-pressed into granules at normal temperature. During the granulation process, the activity of microorganisms and extracts was not destroyed. The high-nutrient and high-activity chemical fertilizer-biological compound fertilizer was obtained by spheroidizing, screening, and packaging, and granules of the obtained chemical fertilizer-biological compound fertilizer were round and had a particle size of 2.8-4.75 mm and a hardness of 30-40 N.

The nutrient contents of nitrogen, phosphorus, and potassium in the obtained chemical fertilizer-biological compound fertilizer were 24.8%, 12.3%, and 7.8%, respectively. Theoretical values of viable numbers of *Bacillus subtilis* and *Bacillus mucilaginosus* were 500 million cfu/g and 260 million cfu/g, respectively. The content of the microbial protectant was 0.54% based on the content of oligosaccharide.

After the above-mentioned chemical fertilizer-biological compound fertilizer was stored at normal temperature for one day, the viable numbers of *Bacillus subtilis* and *Bacillus mucilaginosus* were measured to be 480 million cfu/g and 240 million cfu/g, respectively. After the above-mentioned chemical fertilizer-biological compound fertilizer was stored at normal temperature for 12 months, the viable number of *Bacillus subtilis* was 425 million cfu/g, and the viable number of *Bacillus mucilaginosus* was 213 million cfu/g. The chemical fertilizer-biological compound fertilizer was applied to the soil with an application amount of 100 kg/667 $m^2$. After 10 days, the viable number of *Bacillus*

*subtilis* in the soil was 356,000 cfu/g, and the viable number of *Bacillus mucilaginosus* was 199,000 cfu/g.

Example 3

A high-nutrient and high-activity chemical fertilizer-biological compound fertilizer is provided, including an inorganic chemical fertilizer, a microbial agent, and a microbial protectant.

The inorganic chemical fertilizer includes, in parts by mass: 42.6 parts of urea, 10 parts of ammonium sulfate, 28 parts of monoammonium phosphate, and 15 parts of potassium sulfate.

The microbial agent includes: a *Bacillus subtilis* KC2023Hb bacterial agent, a *Bacillus mucilaginosus* CGMCC No. 17376 bacterial agent, and a *Bacillus megaterium* JD2023Hb bacterial agent. The viable number of the *Bacillus subtilis* bacterial agent is 200 billion cfu/g, the viable number of the *Bacillus mucilaginosus* bacterial agent is 20 billion cfu/g, and the viable number of the *Bacillus megaterium* bacterial agent is 100 billion cfu/g. The microbial agent includes, in parts by mass: 0.2 parts of the *Bacillus subtilis* bacterial agent, 1.3 parts of the *Bacillus mucilaginosus* bacterial agent, and 0.2 parts of the *Bacillus megaterium* bacterial agent.

2.7 parts of the microbial protectant are included, in parts by mass. The microbial protectant includes alginate oligosaccharide, chitosan oligosaccharide, soybean oil, tetrahydropyrimidine, and citric acid in a mass ratio of 80:7: 6:6: 9. The microbial protectant is obtained by quantitatively taking raw materials of the above-mentioned components, stirring and mixing uniformly.

A preparation method for the above-mentioned high-nutrient and high-activity chemical fertilizer-biological compound fertilizer is provided, including the following steps.

After mixing the powdery microbial agent and the microbial protectant, raw materials of the inorganic chemical fertilizer were mixed uniformly with them, without adding binder and moisture. Low-temperature and high-pressure dry granulation was performed, and the mixture was dry-pressed into granules at normal temperature. During the granulation process, the activity of microorganisms and extracts was not destroyed. The high-nutrient and high-activity chemical fertilizer-biological compound fertilizer was obtained by spheroidizing, screening, and packaging, and granules of the obtained chemical fertilizer-biological compound fertilizer were round and had a particle size of 2.8-4.75 mm and a hardness of 30-40 N.

The nutrient contents of nitrogen, phosphorus, and potassium in the obtained chemical fertilizer-biological compound fertilizer were 24.8%, 12.3%, and 7.8%, respectively. Theoretical values of viable numbers of *Bacillus subtilis*, *Bacillus mucilaginosus*, and *Bacillus megaterium* were 400 million cfu/g, 260 million cfu/g, and 200 million cfu/g, respectively. The content of the microbial protectant was 0.54% based on the content of oligosaccharide.

After the above-mentioned chemical fertilizer-biological compound fertilizer was stored at normal temperature for one day, the viable numbers of *Bacillus subtilis, Bacillus mucilaginosus*, and *Bacillus megaterium* were measured to be 380 million cfu/g, 240 million cfu/g, and 170 million cfu/g, respectively. After the above-mentioned chemical fertilizer-biological compound fertilizer was stored at normal temperature for 12 months, the viable number of *Bacillus subtilis* was 305 million cfu/g, the viable number of *Bacillus mucilaginosus* was 226 million cfu/g, and the viable number of *Bacillus megaterium* was 121 million cfu/g. The chemical fertilizer-biological compound fertilizer was applied to the soil with an application amount of 100 kg/667 m$^2$. After 10 days, the viable number of *Bacillus subtilis* in the soil was 226,000 cfu/g, the viable number of *Bacillus mucilaginosus* was 203,000 cfu/g, and the viable number of *Bacillus megaterium* was 138,000 cfu/g.

The above results show that when *Bacillus megaterium* JD2023Hb and *Bacillus subtilis* KC2023Hb are simultaneously present, the tolerance of the microbial agent to a high-concentration inorganic chemical fertilizer may be further improved, and the biological activity of the microbial agent is improved.

Comparative Example 1

A high-nutrient and high-activity chemical fertilizer-biological compound fertilizer is provided, including an inorganic chemical fertilizer, a microbial agent, and a microbial protectant. Compared with example 1, the microbial protectant has a slightly different composition.

The inorganic chemical fertilizer includes, in parts by mass: 42.8 parts of urea, 10 parts of ammonium sulfate, 28 parts of monoammonium phosphate, and 15 parts of potassium sulfate.

The microbial agent includes: a *Bacillus subtilis* ACCC60364 bacterial agent and a *Bacillus mucilaginosus* CGMCC No. 17376 bacterial agent. The viable number of the *Bacillus subtilis* bacterial agent is 200 billion cfu/g, and the viable number of the *Bacillus mucilaginosus* bacterial agent is 20 billion cfu/g. The microbial agent includes, in parts by mass: 0.32 parts of the *Bacillus subtilis* bacterial agent and 1.18 parts of the *Bacillus mucilaginosus* bacterial agent.

2.7 parts of the microbial protectant are included, in parts by mass. The microbial protectant includes burdock oligosaccharide, chitosan oligosaccharide, soybean oil, tetrahydropyrimidine, and citric acid in a mass ratio of 80:7: 6:6: 9. The microbial protectant is obtained by quantitatively taking raw materials of the above-mentioned components, stirring and mixing uniformly.

A preparation method for the above-mentioned high-nutrient and high-activity chemical fertilizer-biological compound fertilizer is provided, including the following steps.

After mixing the powdery microbial agent and the microbial protectant, raw materials of the inorganic chemical fertilizer were mixed uniformly with them, without adding binder and moisture. Low-temperature and high-pressure dry granulation was performed, and the mixture was dry-pressed into granules at normal temperature. During the granulation process, the activity of microorganisms and extracts was not destroyed. The high-nutrient and high-activity chemical fertilizer-biological compound fertilizer was obtained by spheroidizing, screening, and packaging.

The nutrient contents of nitrogen, phosphorus, and potassium in the obtained chemical fertilizer-biological compound fertilizer were 24.9%, 12.3%, and 7.8%, respectively. Theoretical values of viable numbers of *Bacillus subtilis* and *Bacillus mucilaginosus* were 640 million cfu/g and 240 million cfu/g, respectively. The content of the microbial protectant was 0.54% based on the content of oligosaccharide.

After the above-mentioned chemical fertilizer-biological compound fertilizer was stored at normal temperature for one day, the viable numbers of *Bacillus subtilis* and *Bacillus mucilaginosus* were measured to be 620 million cfu/g and 220 million cfu/g, respectively. After the above-mentioned chemical fertilizer-biological compound fertilizer was stored at normal temperature for 12 months, the viable number of *Bacillus subtilis* was 586 million cfu/g, and the viable number of *Bacillus mucilaginosus* was 193 million cfu/g. The chemical fertilizer-biological compound fertilizer was applied to the soil with an application amount of 100 kg/667 m$^2$. After 10 days, the viable number of *Bacillus subtilis* in the soil was 407,000 cfu/g, and the viable number of *Bacillus mucilaginosus* was 143,000 cfu/g.

Comparative Example 2

A chemical fertilizer-biological compound fertilizer is provided, compared with example 1, including an inorganic chemical fertilizer and a microbial agent, not including a microbial protectant.

The inorganic chemical fertilizer includes, in parts by mass: 45.5 parts of urea, 10 parts of ammonium sulfate, 28 parts of monoammonium phosphate, and 15 parts of potassium sulfate.

The microbial agent includes: a *Bacillus subtilis* ACCC60364 bacterial agent and a *Bacillus mucilaginosus* CGMCC No. 17376 bacterial agent. The viable number of the *Bacillus subtilis* bacterial agent is 200 billion cfu/g, and the viable number of the *Bacillus mucilaginosus* bacterial agent is 20 billion cfu/g. The microbial agent includes, in parts by mass: 0.32 parts of the *Bacillus subtilis* bacterial agent and 1.18 parts of the *Bacillus mucilaginosus* bacterial agent.

A preparation method for the above-mentioned chemical fertilizer-biological compound fertilizer is provided, including the following steps.

The above-mentioned powdery microbial agent was mixed with raw materials of the inorganic chemical fertilizer uniformly, without adding binder and moisture. Low-temperature and high-pressure dry granulation was performed, and the mixture was dry-pressed into granules at normal temperature. During the granulation process, the activity of microorganisms and extracts was not destroyed. The chemical fertilizer-biological compound fertilizer was obtained by spheroidizing, screening, and packaging.

The nutrient contents of nitrogen, phosphorus, and potassium in the obtained chemical fertilizer-biological compound fertilizer were 26.1%, 12.3%, and 7.8%, respectively. Theoretical values of viable numbers of *Bacillus subtilis* and *Bacillus mucilaginosus* were 640 million cfu/g and 240 million cfu/g, respectively.

After the above-mentioned chemical fertilizer-biological compound fertilizer was stored at normal temperature for one day, the viable numbers of *Bacillus subtilis* and *Bacillus mucilaginosus* were measured to be 500 million cfu/g and 130 million cfu/g, respectively. After the above-mentioned chemical fertilizer-biological compound fertilizer was stored at normal temperature for 12 months, the viable number of *Bacillus subtilis* was 332 million cfu/g, and the viable number of *Bacillus mucilaginosus* was 56 million cfu/g. The chemical fertilizer-biological compound fertilizer was applied to the soil with an application amount of 100 kg/667 m$^2$. After 10 days, the viable number of *Bacillus subtilis* in the soil was 201,000 cfu/g, and the viable number of *Bacillus mucilaginosus* was 86,000 cfu/g.

The above results show that, when the microbial agent is mixed with the inorganic chemical fertilizer without the microbial protectant, a large number of microorganisms will die, and the activity of microorganisms cannot be maintained in the preservation process of the chemical fertilizer-biological compound fertilizer, leading to continuous decrease in the viable number of microorganisms.

Example 4: High-Nutrient and High-Activity Chemical Fertilizer-Biological Compound Fertilizer Suitable for Summer Maize Planted on Acid Soil A high-nutrient and high-activity chemical fertilizer-biological compound fertilizer is provided, including an inorganic chemical fertilizer, a microbial agent, and a microbial protectant.

The inorganic chemical fertilizer includes, in parts by mass: 45 parts of urea, 28.6 parts of diammonium phosphate, and 23 parts of potassium chloride.

The microbial agent is a *Bacillus subtilis* ACCC19742 bacterial agent, and the viable number of the *Bacillus subtilis* bacterial agent is 200 billion cfu/g. 0.4 parts of the microbial agent are included, in parts by mass.

3 parts of the microbial protectant are included, in parts by mass. The microbial protectant includes alginate oligosaccharide, castor oil, tetrahydropyrimidine, and citric acid in a mass ratio of 80:6: 5:9. The microbial protectant is obtained by quantitatively taking raw materials of the above-mentioned components, stirring and mixing uniformly.

A preparation method for the above-mentioned high-nutrient and high-activity chemical fertilizer-biological compound fertilizer is provided, including the following steps.

After mixing the powdery microbial agent and the microbial protectant, raw materials of the inorganic chemical fertilizer were mixed uniformly with them, without adding binder and moisture. Low-temperature and high-pressure dry granulation was performed, and the mixture was dry-pressed into granules at normal temperature. During the granulation process, the activity of microorganisms and extracts was not destroyed. The high-nutrient and high-activity chemical fertilizer-biological compound fertilizer was obtained by spheroidizing, screening, and packaging, and granules of the obtained chemical fertilizer-biological compound fertilizer were round and had a particle size of 2.8-4.75 mm and a hardness of 30-40 N.

The nutrient contents of nitrogen, phosphorus, and potassium in the obtained chemical fertilizer-biological compound fertilizer were 25.8%, 13.2%, and 12.7%, respectively. A theoretical value of the viable number of *Bacillus subtilis* was 800 million cfu/g. The content of the microbial protectant was 0.6% based on the content of oligosaccharide.

After the above-mentioned chemical fertilizer-biological compound fertilizer was stored at normal temperature for one day, the viable number of *Bacillus subtilis* was measured to be 730 million cfu/g. After the above-mentioned chemical fertilizer-biological compound fertilizer was stored at normal temperature for 12 months, the viable number of *Bacillus subtilis* was 635 million cfu/g. The chemical fertilizer-biological compound fertilizer was applied to the soil with an application amount of 100 kg/667 m$^2$. After 10 days, the viable number of *Bacillus subtilis* in the soil was 562,000 cfu/g.

Example 5

A high-nutrient and high-activity chemical fertilizer-biological compound fertilizer is provided, including an inorganic chemical fertilizer, a microbial agent, and a microbial protectant.

The inorganic chemical fertilizer includes, in parts by mass: 45 parts of urea, 28.6 parts of diammonium phosphate, and 23 parts of potassium chloride.

The microbial agent is a *Bacillus subtilis* KC2023Hb bacterial agent, and the viable number of the *Bacillus subtilis* bacterial agent is 200 billion cfu/g. 0.4 parts of the microbial agent are included, in parts by mass.

3 parts of the microbial protectant are included, in parts by mass. The microbial protectant includes alginate oligosaccharide, castor oil, tetrahydropyrimidine, and citric acid in a mass ratio of 80:6: 5:9. The microbial protectant is obtained by quantitatively taking raw materials of the above-mentioned components, stirring and mixing uniformly.

A preparation method for the above-mentioned high-nutrient and high-activity chemical fertilizer-biological compound fertilizer is provided, including the following steps.

After mixing the powdery microbial agent and the microbial protectant, raw materials of the inorganic chemical fertilizer were mixed uniformly with them, without adding binder and moisture. Low-temperature and high-pressure dry granulation was performed, and the mixture was dry-pressed into granules at normal temperature. During the granulation process, the activity of microorganisms and extracts was not destroyed. The high-nutrient and high-activity chemical fertilizer-biological compound fertilizer was obtained by spheroidizing, screening, and packaging, and granules of the obtained chemical fertilizer-biological compound fertilizer were round and had a particle size of 2.8-4.75 mm and a hardness of 30-40 N.

The nutrient contents of nitrogen, phosphorus, and potassium in the obtained chemical fertilizer-biological compound fertilizer were 25.8%, 13.2%, and 12.7%, respectively. A theoretical value of the viable number of *Bacillus subtilis* was 800 million cfu/g. The content of the microbial protectant was 0.6% based on the content of oligosaccharide.

After the above-mentioned chemical fertilizer-biological compound fertilizer was stored at normal temperature for one day, the viable number of *Bacillus subtilis* was measured to be 710 million cfu/g. After the above-mentioned chemical fertilizer-biological compound fertilizer was stored at normal temperature for 12 months, the viable number of *Bacillus subtilis* was 612 million cfu/g. The chemical fertilizer-biological compound fertilizer was applied to the soil with an application amount of 100 kg/667 m². After 10 days, the viable number of *Bacillus subtilis* in the soil was 553,000 cfu/g.

Example 6

A high-nutrient and high-activity chemical fertilizer-biological compound fertilizer is provided, including an inorganic chemical fertilizer, a microbial agent, and a microbial protectant.

The inorganic chemical fertilizer includes, in parts by mass: 45 parts of urea, 28.4 parts of diammonium phosphate, and 23 parts of potassium chloride.

The microbial agent includes: a *Bacillus subtilis* KC2023Hb bacterial agent and a *Bacillus megaterium* JD2023Hb bacterial agent. The viable number of the *Bacillus subtilis* bacterial agent is 200 billion cfu/g, and the viable number of the *Bacillus megaterium* bacterial agent is 100 billion cfu/g. The microbial agent includes, in parts by mass: 0.4 parts of the *Bacillus subtilis* bacterial agent and 0.2 parts of the *Bacillus megaterium* bacterial agent.

3 parts of the microbial protectant are included, in parts by mass. The microbial protectant includes alginate oligosaccharide, castor oil, tetrahydropyrimidine, and citric acid in a mass ratio of 80:6: 5:9. The microbial protectant is obtained by quantitatively taking raw materials of the above-mentioned components, stirring and mixing uniformly.

A preparation method for the above-mentioned high-nutrient and high-activity chemical fertilizer-biological compound fertilizer is provided, including the following steps.

After mixing the powdery microbial agent and the microbial protectant, raw materials of the inorganic chemical fertilizer were mixed uniformly with them, without adding binder and moisture. Low-temperature and high-pressure dry granulation was performed, and the mixture was dry-pressed into granules at normal temperature. During the granulation process, the activity of microorganisms and extracts was not destroyed. The high-nutrient and high-activity chemical fertilizer-biological compound fertilizer was obtained by spheroidizing, screening, and packaging, and granules of the obtained chemical fertilizer-biological compound fertilizer were round and had a particle size of 2.8-4.75 mm and a hardness of 30-40 N.

The nutrient contents of nitrogen, phosphorus, and potassium in the obtained chemical fertilizer-biological compound fertilizer were 25.8%, 13.1%, and 12.7%, respectively. A theoretical value of the viable number of *Bacillus subtilis* was 800 million cfu/g, and a theoretical value of the viable number of *Bacillus megaterium* was 200 million cfu/g. The content of the microbial protectant was 0.6% based on the content of oligosaccharide.

After the above-mentioned chemical fertilizer-biological compound fertilizer was stored at normal temperature for one day, the viable number of *Bacillus subtilis* was measured to be 750 million cfu/g, and the viable number of *Bacillus megaterium* was measured to be 160 million cfu/g. After the above-mentioned chemical fertilizer-biological compound fertilizer was stored at normal temperature for 12 months, the viable number of *Bacillus subtilis* was 690 million cfu/g, and the viable number of *Bacillus megaterium* was 106 million cfu/g. The chemical fertilizer-biological compound fertilizer was applied to the soil with an application amount of 100 kg/667 m². After 10 days, the viable number of *Bacillus subtilis* in the soil was 560,000 cfu/g, and the viable number of *Bacillus megaterium* was 102,000 cfu/g.

The above results show that when *Bacillus megaterium* JD2023Hb and *Bacillus subtilis* KC2023Hb are simultaneously present, the tolerance of the microbial agent to a high-concentration inorganic chemical fertilizer may be further improved, and the biological activity of the microbial agent is improved.

Comparative Example 3

A chemical fertilizer-biological compound fertilizer is provided, including an inorganic chemical fertilizer, a microbial agent, and a microbial protectant. Different from example 4, the microbial protectant has a slightly different composition.

The inorganic chemical fertilizer includes, in parts by mass: 45 parts of urea, 28.6 parts of diammonium phosphate, and 23 parts of potassium chloride.

The microbial agent is a *Bacillus subtilis* ACCC19742 bacterial agent, and the viable number of the *Bacillus subtilis* bacterial agent is 200 billion cfu/g. 0.4 parts of the microbial agent are included, in parts by mass.

3 parts of the microbial protectant are included, in parts by mass. The microbial protectant includes alginate oligosaccharide, castor oil, trehalose, and citric acid in a mass ratio of 80:6: 5:9. The microbial protectant is obtained by quantitatively taking raw materials of the above-mentioned components, stirring and mixing uniformly.

A preparation method for the above-mentioned high-nutrient and high-activity chemical fertilizer-biological compound fertilizer is provided, including the following steps.

After mixing the powdery microbial agent and the microbial protectant, raw materials of the inorganic chemical fertilizer were mixed uniformly with them, without adding binder and moisture. Low-temperature and high-pressure dry granulation was performed, and the mixture was dry-pressed into granules at normal temperature. During the granulation process, the activity of microorganisms and extracts was not destroyed. The high-nutrient and high-activity chemical fertilizer-biological compound fertilizer was obtained by spheroidizing, screening, and packaging.

The nutrient contents of nitrogen, phosphorus, and potassium in the obtained chemical fertilizer-biological compound fertilizer were 25.8%, 13.2%, and 12.7%, respectively. A theoretical value of the viable number of *Bacillus subtilis* was 800 million cfu/g. The content of the microbial protectant was 0.6% based on the content of oligosaccharide.

After the above-mentioned chemical fertilizer-biological compound fertilizer was stored at normal temperature for one day, the viable number of *Bacillus subtilis* was measured to be 720 million cfu/g. After the above-mentioned chemical fertilizer-biological compound fertilizer was stored at normal temperature for 12 months, the viable number of *Bacillus subtilis* was 615 million cfu/g. The chemical fertilizer-biological compound fertilizer was applied to the soil with an application amount of 100 kg/667 m$^2$. After 10 days, the viable number of *Bacillus subtilis* in the soil was 552,000 cfu/g.

The above results show that, compared to example 4, tetrahydropyrimidine in the microbial protectant is replaced with trehalose, although both can stabilize the protein structure of the strain, the microbial protectant of example 4 has a better protective effect on the microbial agent.

Comparative Example 4

A chemical fertilizer-biological compound fertilizer is provided, different from example 4, including an inorganic chemical fertilizer and a microbial agent, not including a microbial protectant.

The inorganic chemical fertilizer includes, in parts by mass: 45 parts of urea, 31.6 parts of diammonium phosphate, and 23 parts of potassium chloride.

The microbial agent is a *Bacillus subtilis* ACCC19742 bacterial agent, and the viable number of the *Bacillus subtilis* bacterial agent is 200 billion cfu/g. 0.4 parts of the microbial agent are included, in parts by mass.

A preparation method for the above-mentioned chemical fertilizer-biological compound fertilizer is provided, including the following steps.

The above-mentioned powdery microbial agent was mixed with raw materials of the inorganic chemical fertilizer uniformly, without adding binder and moisture. Low-temperature and high-pressure dry granulation was performed, and the mixture was dry-pressed into granules at normal temperature. During the granulation process, the activity of microorganisms and extracts was not destroyed. The chemical fertilizer-biological compound fertilizer was obtained by spheroidizing, screening, and packaging.

The nutrient contents of nitrogen, phosphorus, and potassium in the obtained chemical fertilizer-biological compound fertilizer were 26.4%, 14.5%, and 12.7%, respectively. A theoretical value of the viable number of *Bacillus subtilis* was 800 million cfu/g.

After the above-mentioned chemical fertilizer-biological compound fertilizer was stored at normal temperature for one day, the viable number of *Bacillus subtilis* was measured to be 520 million cfu/g. After the above-mentioned chemical fertilizer-biological compound fertilizer was stored at normal temperature for 12 months, the viable number of *Bacillus subtilis* was 298 million cfu/g. The chemical fertilizer-biological compound fertilizer was applied to the soil with an application amount of 100 kg/667 m$^2$. After 10 days, the viable number of *Bacillus subtilis* in the soil was 262,000 cfu/g.

The above results show that, when the microbial agent is mixed with the inorganic chemical fertilizer without the microbial protectant, a large number of microorganisms will die, and the activity of microorganisms cannot be maintained in the preservation process of the chemical fertilizer-biological compound fertilizer, leading to continuous decrease in the viable number of microorganisms.

Example 7: Application Effect Experiment

Application Effect of High-Nutrient and High-Activity Chemical Fertilizer-Biological Compound Fertilizer of Example 1 on Summer Maize Planted on Saline-Alkali Soil 1. Test Materials and Methods:

Field test site: Changyi City, Weifang City, Shandong Province. Time: June-October 2020. Test crop: summer maize, Denghai 605. Test fertilizers: the chemical fertilizer-biological compound fertilizer in example 1 with N—P$_2$O$_5$—K$_2$O-microbial agent of 24.9%-12.3%-7.8%-840 million cfu/g, a common compound fertilizer with N—P$_2$O$_5$—K$_2$O of 24.9%-12.3%-7.8%, urea (N of 46%), triple superphosphate (P$_2$O$_5$ of 42%), and potassium sulfate (K$_2$O of 52%). Test plot: the soil was saline-alkali soil with a pH of plough layer soil of 8.27, an organic matter content of 14.15 g/kg, rapidly available nitrogen of 10.8 mg/kg, available phosphorus 12.07 mg/kg, and rapidly available potassium of 183.0 mg/kg.

Test design: a block design was adopted with six treatments: (1) CK, no fertilization; (2) No, no nitrogen fertilizer, input amounts of phosphorus and potassium being the same as the farmers' habit; (3) P$_0$, no phosphorus fertilizer, input amounts of nitrogen and potassium being the same as the farmers' habit; (4) K$_0$, no potassium fertilizer, input amounts of nitrogen and phosphorus being the same as farmers' habit; (5) FP, farmers' habit, a common compound fertilizer with N—P$_2$O$_5$—K$_2$O being 24.9-12.3-7.8, respectively, and (6) HSF1, the fertilizer of example 1. Each treatment area was 5 mu.

Fertilizer application method: the application amount according to the farmers' habit and the application amount of the fertilizer of example 1 were 60 kg/mu, and the application amounts of the fertilizers of N$_0$, P$_0$, and K$_0$ treatments were 17.6 kg/mu of triple superphosphate+9 kg/mu of potassium sulfate, 32.4 kg/mu of urea+9 kg/mu of potassium sulfate, 32.4 kg/mu of urea+17.6 kg/mu of triple superphosphate, respectively. All the fertilizers were applied at one time, and the seeds and fertilizers were mechanically sown at the same time.

Measurement indicators: maize grain and straw yield; contents of N, P, and K in the straw and grain, the fertilizer utilization rate being calculated according to the contents; rapidly available NPK, pH, and organic matter in 0-20 cm soil at the mature period of maize.

2. Results and Analysis 2.1 Influence of Different Fertilization Treatments on Maize Yield and Fertilizer Utilization Rate The results in Table 1 showed that the application of the fertilizer of example 1 increased the yield by 13.28% compared with the fertilization treatment according to the farmers' habit. The yield of fertilization treatment was significantly higher than that of no fertilization as well as the fertilizer treatment with insufficient nutrients. The application of the fertilizer of example 1 increased the utilization rates of the nitrogen, phosphorus, and potassium fertilizers by 6.3, 11.8, and 12.4 percentage points, respectively, compared with the fertilization treatment according to the farmers' habit.

TABLE 1

Influence of different treatments on maize grain yield and fertilizer utilization rate

| Treatment | Yield (kg/hm$^2$) | Fertilizer utilization rate (%) | | |
|---|---|---|---|---|
| | | Nitrogen | Phosphorus | Potassium |
| CK | 5664.75 e | / | / | / |
| N$_0$ | 6693.15 d | / | / | / |
| P$_0$ | 7942.95 c | / | / | / |
| K$_0$ | 7990.80 c | / | / | / |
| FP | 8464.65 b | 38.83 b | 16.32 b | 35.79 b |
| HSF1 | 9588.45 a | 45.13 a | 28.12 a | 48.19 a |

Note:
the different letters in the same column indicate a significance level of difference of up to 5%. Same below.

2.2 Influence of Different Fertilization Treatments on Nutrients in the Soil after Maize Harvest Table 2 showed that the nutrient contents of available phosphorus and rapidly available potassium in the soil without fertilizer treatment and without phosphorus and potassium treatments decreased significantly. The phosphorus and potassium in the soil treated with the fertilizer of example 1 increased by 10.65% and 5.62%, respectively. The organic matter increased by 4.14%, but the difference was not obvious.

TABLE 2

Influence of different treatments on nutrients, organic matter, and pH in the soil after maize harvest

| Treatment | Alkali-hydrolyzable nitrogen (mg/kg) | Available phosphorus (mg/kg) | Rapidly available potassium (mg/kg) | Organic matter (g/kg) | pH value |
|---|---|---|---|---|---|
| CK | 9.32 c | 10.08 c | 176.31 bc | 14.61 a | 8.33 a |
| N$_0$ | 9.05 cd | 12.22 b | 173.5 bc | 13.23 b | 8.34 a |
| P$_0$ | 12.1 ab | 10.92 c | 182.34 b | 13.34 b | 8.22 ab |
| K$_0$ | 12.33 ab | 13.19 b | 153.84 d | 13.12 b | 8.16 ab |
| FP | 13.45 a | 15.12 ab | 194.67 ab | 14.74 a | 7.67 b |
| HSF1 | 13.69 a | 16.73 a | 205.62 a | 15.35 a | 7.56 b |

3. Conclusion

The application of the fertilizer of example 1 increased the yield by 13.28% compared with the fertilization treatment according to the farmers' habit. The utilization rates of the nitrogen, phosphorus, and potassium fertilizers increased by 6.3, 11.8, and 12.4 percentage points, respectively. Phosphorus and potassium in the soil increased by 10.65% and 5.62%, respectively.

Example 8: Application Effect Experiment

Application effect of high-nutrient and high-activity chemical fertilizer-biological compound fertilizer of example 4 on summer maize planted on acid soil 1. Test materials and methods:

Field test site: Zhifu District, Yantai City, Shandong Province. Time: June-October 2021. Test crop: summer maize, Denghai 605. Test fertilizers: the chemical fertilizer-biological compound fertilizer in example 4 with N—P$_2$O$_5$—K$_2$O-microbial agent of 25.8%-13.2%-12.7%-730 million cfu/g, a common compound fertilizer with N—P$_2$O$_5$—K$_2$O of 25.8%-13.2%-12.7%, urea (N of 46%), triple superphosphate (P$_2$O$_5$ of 42%), and potassium chloride (K$_2$O of 55%). Test plot: the soil was brown soil with a pH of plough layer soil of 6.3, an organic matter content of 13.2 g/kg, rapidly available nitrogen of 68.9 mg/kg, available phosphorus 10.3 mg/kg, and rapidly available potassium of 112.0 mg/kg.

Test design: a block design was adopted with six treatments: (1) CK, no fertilization; (2) No, no nitrogen fertilizer, input amounts of phosphorus and potassium being the same as the farmers' habit; (3) P$_0$, no phosphorus fertilizer, input amounts of nitrogen and potassium being the same as the farmers' habit; (4) K$_0$, no potassium fertilizer, input amounts of nitrogen and phosphorus being the same as farmers' habit; (5) FP, farmers' habit, a common compound fertilizer with N—P$_2$O$_5$—K$_2$O being 25.8-13.2-12.7, respectively, and (6) HSF2, the fertilizer of example 4. Each treatment area was 3 mu.

Fertilizer application method: the application amount according to the farmers' habit and the application amount of the fertilizer of example 4 were 50 kg/mu, and the application amounts of the fertilizers of N$_0$, P$_0$, and K$_0$ treatments were 15.7 kg/mu of triple superphosphate+12.2 kg/mu of potassium chloride, 28 kg/mu of urea+12.2 kg/mu of potassium chloride, 28 kg/mu of urea+15.7 kg/mu of triple superphosphate, respectively. All the fertilizers were applied at one time, and the seeds and fertilizers were mechanically sown at the same time.

Measurement indicators: maize grain and straw yield; contents of N, P, and K in the straw and grain, the fertilizer utilization rate being calculated according to the contents; rapidly available NPK, pH, and organic matter in 0-20 cm soil at the mature period of maize.

2. Results and Analysis 2.1 Influence of Different Fertilization Treatments on Maize Yield and Fertilizer Utilization Rate The results in Table 3 showed that the application of the fertilizer of example 4 increased the yield by 14.3% compared with the fertilization treatment according to the farmers' habit. The yield of fertilization treatment was significantly higher than that of no fertilization as well as the fertilizer treatment with insufficient nutrients. The application of the fertilizer of example 4 increased the utilization rates of the nitrogen, phosphorus, and potassium fertilizers by 8.8, 13.2, and 15.0 percentage points, respectively, compared with the fertilization treatment according to the farmers' habit.

TABLE 3

Influence of different treatments on maize grain yield and fertilizer utilization rate

| Treatment | Yield (kg/hm$^2$) | Fertilizer utilization rate (%) | | |
|---|---|---|---|---|
| | | Nitrogen | Phosphorus | Potassium |
| CK | 5628.15 d | / | / | / |
| N$_0$ | 5978.10 d | / | / | / |
| P$_0$ | 7963.65 bc | / | / | / |
| K$_0$ | 8332.65 b | / | / | / |
| FP | 8950.95 b | 36.21 b | 18.63 b | 40.60 b |
| HSF2 | 10231.50 a | 45.01 a | 31.83 a | 55.60 a |

2.2 Influence of Different Fertilization Treatments on Nutrients in the Soil after Maize Harvest Table 4 showed that the nutrient contents of available phosphorus and rapidly available potassium in the soil without fertilizer treatment and without phosphorus and potassium treatments decreased significantly. The phosphorus and potassium in the soil treated with the fertilizer of example 4 increased by 11.16% and 8.82%, respectively. The organic matter increased by 3.17%, but the difference was not obvious.

TABLE 4

Influence of different treatments on nutrients, organic matter, and pH in the soil after maize harvest

| Treatment | Alkali-hydrolyzable nitrogen (mg/kg) | Available phosphorus (mg/kg) | Rapidly available potassium (mg/kg) | Organic matter (g/kg) | pH value |
|---|---|---|---|---|---|
| CK | 63.72 cd | 9.97 cd | 101.33 bc | 14.69 ab | 6.75 a |
| N$_0$ | 56.75 d | 24.29 a | 113.50 b | 12.69 b | 6.84 a |
| P$_0$ | 72.10 c | 11.92 c | 103.50 bc | 13.75 ab | 6.53 ab |
| K$_0$ | 95.37 b | 13.19 c | 89.00 d | 13.09 ab | 6.34 b |
| FP | 119.64 a | 23.12 ab | 124.67 ab | 14.84 ab | 6.36 b |
| HSF2 | 121.44 a | 25.70 a | 135.67 a | 15.31 a | 6.37 b |

3. Conclusion

The application of the fertilizer of example 4 increased the yield by 14.3% compared with the fertilization treatment according to the farmers' habit. The utilization rates of the nitrogen, phosphorus, and potassium fertilizers increased by 8.8, 13.2, and 15.0 percentage points, respectively. Phosphorus and potassium in the soil increased by 11.16% and 8.82%, respectively.

The invention claimed is:

1. A chemical fertilizer-biological compound fertilizer, comprising an inorganic chemical fertilizer, a microbial agent, and a microbial protectant, wherein the microbial protectant mainly comprises, in parts by mass, 65-85 parts of alginate oligosaccharide and 5-8 parts of tetrahydropyrimidine, and wherein the chemical fertilizer-biological compound fertilizer has nutrient contents of nitrogen, phosphorus, and potassium of greater than 40% and a viable number of microorganisms of 200 million cfu/g or more.

2. The chemical fertilizer-biological compound fertilizer according to claim 1, wherein the microbial protectant further comprises at least one of burdock oligosaccharide, chitosan oligosaccharide, amino acid, vegetable oil, fumaric acid, and citric acid.

3. The chemical fertilizer-biological compound fertilizer according to claim 2, wherein components in the microbial protectant comprise, in parts by mass: 4-6 parts of burdock oligosaccharide, 6-10 parts of chitosan oligosaccharide, 6-10 parts of amino acid, 5-10 parts of vegetable oil, 8-10 parts of fumaric acid, and 6-10 parts of citric acid.

4. The chemical fertilizer-biological compound fertilizer according to claim 3, wherein the burdock oligosaccharide has a degree of polymerization of 10-15.

5. The chemical fertilizer-biological compound fertilizer according to claim 3, wherein the amino acid comprises one or more of glutamic acid, aspartic acid, and phenylalanine.

6. The chemical fertilizer-biological compound fertilizer according to claim 3, wherein the vegetable oil comprises soybean oil and/or castor oil.

7. The chemical fertilizer-biological compound fertilizer according to claim 2, wherein the microbial protectant is obtained by quantitatively taking raw materials of the components of the microbial protectant, stirring and mixing uniformly.

8. The chemical fertilizer-biological compound fertilizer according to claim 1, further comprising a microbial protectant, wherein a mass ratio of the microbial protectant to the microbial agent is $\geq 1$.

9. The chemical fertilizer-biological compound fertilizer according to claim 8, wherein the mass ratio of the microbial protectant to the microbial agent is (1-100): 1.

10. The chemical fertilizer-biological compound fertilizer according to claim 1, wherein the inorganic chemical fertilizer comprises an inorganic nitrogen fertilizer, an inorganic phosphorus fertilizer, and an inorganic potassium fertilizer; the inorganic chemical fertilizer comprises, in parts by mass: 15-55 parts of the inorganic nitrogen fertilizer, 20-50 parts of the inorganic phosphorus fertilizer, and 10-50 parts of the inorganic potassium fertilizer.

11. The chemical fertilizer-biological compound fertilizer according to claim 10, wherein the inorganic nitrogen fertilizer comprises urea and ammonium sulfate; the inorganic phosphorus fertilizer comprises monoammonium phosphate and diammonium phosphate; the inorganic potassium fertilizer comprises potassium sulfate, potassium chloride, and potassium nitrate.

12. The chemical fertilizer-biological compound fertilizer according to claim 1, wherein the microbial agent mainly comprises at least one of *Bacillus amyloliquefaciens* and *Bacillus subtilis*.

13. The chemical fertilizer-biological compound fertilizer according to claim 12, wherein the microbial agent further comprises one or more of *Bacillus megaterium, Bacillus mucilaginosus, Brevibacillus laterosporu, Bacillus thuringiensis, Paenibacillus polymyxa*, and *Trichoderma harzianum*.

14. The chemical fertilizer-biological compound fertilizer according to claim 1, wherein the chemical fertilizer-biological compound fertilizer has nutrient contents of nitrogen, phosphorus, and potassium of 40-55% and a viable number of microorganisms of 0.2-1 billion cfu/g.

15. The chemical fertilizer-biological compound fertilizer according to claim 1, wherein the alginate oligosaccharide has a molecular weight 2000 Da or less, a degree of polymerization of 2-20, and a 2-6 sugar content 70% or more.

16. The chemical fertilizer-biological compound fertilizer according to claim 1, wherein the microbial protectant is obtained by quantitatively taking raw materials of the components of the microbial protectant, stirring and mixing uniformly.

17. A preparation method for the chemical fertilizer-biological compound fertilizer according to claim 8, comprising the steps of:

mixing a microbial agent and a microbial protectant, and then mixing with raw materials of an inorganic chemical fertilizer uniformly, granulating, spheroidizing, screening, and packaging to obtain the chemical fertilizer-biological compound fertilizer.

18. The preparation method according to claim 17, wherein granules of the obtained chemical fertilizer-biological compound fertilizer are round and have a particle size of 2.8-4.75 mm and a hardness of 30-40 N.

* * * * *